United States Patent [19]

Sorenson

[11] 3,780,662

[45] Dec. 25, 1973

[54] RADAR REFLECTOR DEPLOYMENT METHOD

[76] Inventor: Glenn P. Sorenson, 148 Los Cerras, Walnut Creek, Calif. 94598

[22] Filed: Sept. 1, 1965

[21] Appl. No.: 485,672

Related U.S. Application Data

[63] Continuation-in-part of Ser. No. 256,549, Feb. 6, 1963, abandoned.

[52] U.S. Cl. ............... 102/89, 343/18 B, 343/18 E
[51] Int. Cl. ..................... F42b 13/56, H01q 17/00
[58] Field of Search ..................... 102/63, 89, 37.4, 102/34.4; 343/18 B, 18 E; 258/1, 1.2, 5, 7; 254/134.3, 134.4, 135.5, 135.6

[56] References Cited
UNITED STATES PATENTS

| | | | |
|---|---|---|---|
| 3,156,185 | 11/1964 | Hermann | 102/89 X |
| 3,143,965 | 8/1964 | La Pointe | 102/89 X |
| 3,266,423 | 8/1966 | Simpson | 102/89 |

Primary Examiner—Robert F. Stahl
Attorney—Edwin E. Greigg

EXEMPLARY CLAIM

1. A device for deploying radar reflector material comprising a spinner rocket, a radar reflector wound about substantially the entire periphery of said rocket, said radar reflector including a monofilament fiberglass thread.

10 Claims, 3 Drawing Figures

RADAR REFLECTOR DEPLOYMENT METHOD

This application in a continuation-in-part application of application Ser. No. 256,549, filed Feb. 6, 1963, entitled "Radar Reflector Deployment Method," now abandoned.

This invention relates, in general, to the field of radar reflectors and, more particularly, to a method of effectively deploying a long continuous monofilament radar reflector fiber as well as the article for laying out the filament per se. A monofilament fiberglass thread, 0.005 inches in diameter, has been developed upon which is coated a thin film of various metals. Lengths of this thread as long as 30 kilometers appear to be feasible.

Heretofore, this long fibrous material has been trailed out of carrier vehicles as a series of long parallel threads whereby a relatively long and thin radar reflector is created. This system depends upon the inability of radar detection devices to discriminate between two relatively close radar stimuli. For example, threads of monofilament radar reflectors need only be spaced a few dozen feet apart to render enemy radar ineffective. However, great difficulties have been encountered in effectively deploying this radar reflector thread. Not the least of these difficulties is the problem of maintaining the thread as an integral or continuous fiber. Monofilament glass fiber in very small diameter has been found to be relatively brittle thus making it impossible to trail this fiber in long lengths. This means that manufacturing techniques in this field are far in advance of deployment techniques. Moreover, this fiber tends to become tangled and knotted rendering it useless. Other problems include effective deployment of a large number of threads from single carrier vehicles and the rapidity with which these fibers may be deployed.

In accordance with the present invention, a miniature rocket is employed to disperse these unique radar reflectors. Such miniature rockets have been manufactured in sizes ranging from about 1/10 inch to 1 inch in diameter. These rockets are spin stabilized and have rotational velocities as high as 10,000 revolutions per second, depending upon the rocket design. The aforementioned radar reflectors are wound or wrapped around the periphery of the rocket, and when the rocket is fired, the fiber is spun or unwound off the rocket leaving a trail of fiber.

Two situations may exist using this method. First, the ratio of the number of revolutions to the distance traveled, sometimes designated $v$, may be lower than 2 radians per caliber with the result that the thread will be pulled off the rocket periphery by inertia or drag forces. The second situation is when $v$ is greater than 2 radians per caliber whereby the thread or fiber is laid off the rocket periphery as fast as the rocket advances. As may be anticipated, high spin rates are necessary to lay off fibers at high forward velocities. A high spin rate induces stress conditions in the rocket casing which places an upper limit on the velocity at which fibers or threads may be laid out in a stationary helical wave. This may be found from the relationship $$S = v^2 V^2 \rho / 4g$$

where:
 $S$ is yield stress of the casing material
 $V$ is the projectile forward velocity
 $\rho$ is the density of the casing material
 $g$ is the acceleration of gravity For a steel rocket casing, the maximum velocity at which a fiber may be laid off the rocket periphery in a standing wave would be about 2,000 feet per second. Higher velocities would result in rocket destruction as a result of the high rocket angular velocity. The advantage of laying off fiber over pulling it off is apparent where the fiber to be deployed is a relatively fragile radar reflector. Moreover, both techniques, laying and pulling off small threads, avoid entanglement.

One design which uses a spin stabilized rocket would have 10 grams of monofilament radar reflector material, (this material has a denity of 2.5 grams per cubic centimeter or about 3 kilometers of this fiber per gram) wound about a rocket weighing about 1 gram. Fired in the upper atmosphere, the spinner rocket would reach a relative velocity from about 300–2,000 feet per second and start unraveling thread by spinning it off from about 1,500–4,500 revolutions per second. In less than 1 second later, 30 kilometers of monofilament radar reflector would be deployed in a relatively straight line. Using this method, salvos of rockets may be rapidly deployed to blanket large areas with radar reflectors in both atmospheric and space applications.

The principal object of the invention is to provide a means for deploying a monofilament fiberglass thread substantially 0.005 inch in diameter in space to deceive enemy radar.

A still further object of the invention is to provide a spinner rocket capable of attaining a relative velocity from about 300–2,000 feet per second and capable of laying off its periphery a thread from about 1,500–4,500 revolutions per second.

Still another object of the invention is to teach a method heretofore not attainable in the prior art which will enable a large area to be completely blanketed with radar reflectors incapable of being detected by enemy radar.

A further object of the invention is to deploy long fragile threads into space or atmosphere without tangling or breaking them.

The details of the invention, as well as additional objects and advantages will be clearly understood with reference to the embodiments illustrated in the accompanying drawings employing reference numerals to identify the respective elements thereof, wherein.

Figure 1:
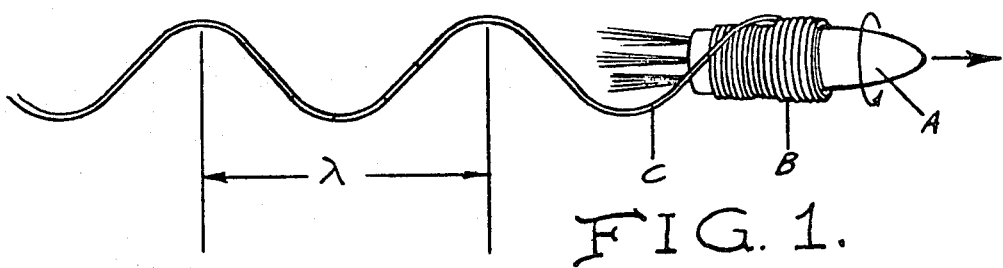
FIG. 1 is a perspective view of the rocket and radar reflector material wound therearound according to the principles of the invention.

Turning now to the drawing there is shown a miniature spin-stabilized rocket A which weighs approximately 1 gram, and about the periphery of which is wound, for example, substantially 10 grams of monofilament radar reflector material B. This filament material would then be unwound into an air stream in the form of a standing helix as the rocket moves along its flight path. Flight speeds from 500–2,400 feet per second have been achieved with these rockets so that short "bloom" times can be achieved. The high spin rate (approximately 2,000 revolutions per second) required for stable flight will serve to feed the monofilament into the air stream at a rate comparable to the linear velocity of the rocket. Thus, the monofilament can be unwound without "pulling" it off and breakage will be minimized or eliminated.

Spin is normally imparted to the rocket by canting the exhaust nozzles so that a small component of the thrust is used to produce a torque about the longitudinal axis of the rocket. The spin of the rocket is usually designated by $\nu$ of the radians turned per caliber (diameter) of distance traveled. That is:

$$\nu = Wt/(Vt/D)\ 32\ WD/V = 2\ U/V \quad (1)$$

where:
- $W$ = spin rate (radians per second)
- $V$ = axial velocity
- $D$ = diameter
- $U$ = peripheral velocity Typically $\nu$ is about 0.5. Other values can be used but for sea level conditions $\nu$ must be greater than about 0.1 to achieve flight stability. For the peripheral velocity of the rocket to be equal to its axial velocity $\nu$ must have a value of 2 as observed in Equation (1) above. This relationship is desirable because the monofilament will then be fed out into the air stream without being pulled off. Any sudden tensile strain on the monofilament, therefore, will be essentially eliminated.

The high spin rate induces stress conditions on the rocket casing and in the monofilament which places an upper limit on the velocity at which the filament or threads B may be laid out in a standing helical wave. For example, if it is assumed that $V = U$, the maximum allowable axial velocity is given approximately by the formula:

$$S = \rho(\nu V)^2/4g \quad (2)$$

Based on assumed reliable stresses the following limiting axial velocities are obtained using Equation (2):

TABLE 1

| Case | S (psi) | V (fps) |
|---|---|---|
| Fiberglass | 1×10⁵ | 1970 |
| Steel | 0.5×10⁵ | 684 |
| Aluminum | 0.3×10⁵ | 910 |

Equation (2) shows that the maximum velocity is proportional to the strength-to-weight ratio of the material employed. The above table, accordingly, shows a high velocity can be achieved with fiberglass-type materials as compared to either steel or aluminum. If the required peripheral speed is less than the axial speed, higher velocities greater than those given by Equation (2) can be achieved.

Because the angular slowing down length of the rocket is greater than the axial slowing down length, the spin is essentially constant during filament layout after motor burnout of the rocket. Further, it can be shown that the length of filament which may be deployed is dependent on the maximum allowance "bloom" time, the peripheral velocity of the rocket, and the number of turns of filament which play-off per turn of the rocket. It is thus desirable to design a rocket motor to provide the maximum spin (peripheral velocity) allowed by the choice of materials and configurations and to initiate laying out filament only after the rocket has attained maximum velocity (i.e., after motor burnout). For this reason it is necessary to provide a release mechanism for the filament which senses the instant when the angular or radial acceleration goes to zero (motor burnout). A simple friction means, such as a suitable adhesive bond between a portion of the filament and the rocket casing, may be provided so as to break in response to a given centrifugal force resulting from the radial acceleration. Alternatively, a frangible cover or the like may be designed to break away by the stress forces resulting from the radial acceleration. The moment of release in these two cases (adhesive, frangible cover) occurs at some angular velocity which would be just below the minimum angular velocity attained at motor burnout.

Figure 2:
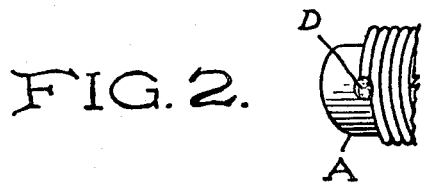
FIG. 2 is a detailed view showing a means for securing the reflector to the rocket casing.

In the case of an adhesive material utilized for securing the fiber to the rocket casing, as best shown in FIG. 2, where a drop of adhesive material D is used to fix the ends of the filament to the rocket case during acceleration, it can be readily shown that the centrifugal force acting on a hemispherical drop is given (assuming $d <<< D$) by:

$$F_c = ma_r = (\pi^3/6g)\ \rho_a d_a^3 D S^2 \quad (3)$$

where:
- $m$ = mass (slugs)
- $a_r$ = radial acceleration, feet per second squared
- $g$ = gravitational constant, 386 (lb$_m$/lb$_f$) (in/sec²)
- $d_a$ = diameter of drop of adhesive, inches
- $D$ = diameter of rocket casing, inches
- $S$ = rotational velocity, revolutions per second
- $\rho_a$ = density of adhesive, lbs–m/in³

Besides this centrifugal force perpendicular to the case, there is also, on the adhesive drop, a force $F_H$ along the case circumference which is the result of stress in the filament caused by the centrifugal force acting on the filament itself.

$$F_H = (\pi^3/4g)\ \rho_r d_r^2 D^2 S^2 \quad (4)$$

where:
- $\rho_r$ = density of filament, lbs.–m/in³
- $d_r$ = diameter of filament, inches For a 1/16 inch diameter drop holding on a 0.004 inch diameter filament on a 0.5 inch diameter case rotating at 1,500 revolutions per second, $F_c$ = 5.9 lbs., while $F_H$ = 0.4 lbs.

Figure 3:
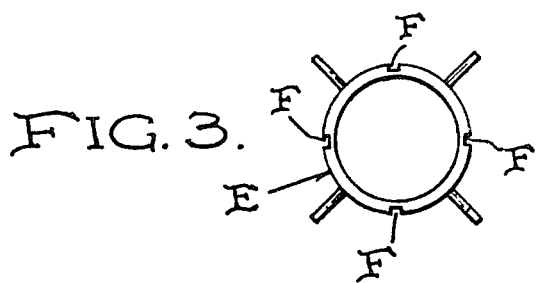
FIG. 3 is a detailed view of a further embodiment for securing the reflector to the rocket casing.

As seen from the above, it appears that the adhesive release means which has been useful at 1,500 revolutions per second on a 0.5 inch diameter casing may not be useful at higher angular velocities. Accordingly, the alternative method of providing a frangible ring release means may be used for such higher velocities. As best shown in FIG. 3, a ring E of suitable material grooved along the width may be designed to fracture at a preselected angular velocity. This is controlled by a fraction of material which is left on the grooved section F. It can be shown that for a thin ring:

$$t_c/t = (\rho_r \pi^2 D^2 s^2/\sigma_b g_c) \quad (5)$$

where:
- $t_c$ = thickness of frangible ring in cut section, inches
- $t$ = thickness of frangible ring, inches
- $\rho_r$ = density of frangible ring, lb.$_m$/in³
- $\sigma_b$ = breaking stress, lb.$_f$/in²

$D$ = diameter of frangible ring, inches
$s$ = angular speed, revolutions per second
$g$ = gravitational constant, 386 $lb_m/lb_f$ in/sec$^2$ With a given $p_r$, $D$ and $t_c/t$, the ring is observed to fracture at some angular speed $s$. This provides an experimental determination of the actual breaking stress $\sigma_b$. This value is then used for that particular material in designing the ring configuration. For example, Lucite rings have been reliably used to release filament at about 3,500 revolutions per second on an 0.5 inch case and aluminum rings have been designed to similarly perform at about 4,500 revolutions per second on an 0.5 inch case.

When a filament of the type referred to above is utilized, it has been found that when the spinner rocket A is fired in the upper atmosphere, it will attain a relative forward velocity from 300–2,000 feet per second and lay off the thread from 1,500–4,500 revolutions per second. Thus, in about the period of time referred to, substantially 30 kilometers of monofilament radar reflector material is laid off in a relatively straight line. Manifestly, when a series of such rockets are disseminated in a salvo, an extremely wide area can be blanketed, thereby preventing discrimination by radar reflectors.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

That which is claimed is:

1. A device for deploying radar reflector material comprising a spinner rocket, a radar reflector wound about substantially the entire periphery of said rocket, said radar reflector including a monofilament fiberglass thread.

2. The device according to claim 1, wherein said monofilament fiberglass thread is approximately 0.005 inches in diameter and includes a metallic coating.

3. The device according to claim 2, wherein said metallic coating weighs approximately 10 grams.

4. The device according to claim 1, wherein said rocket weighs 1 gram.

5. A device for deploying radar reflector material comprising a spinner rocket, a radar reflector material wound about substantially the entire periphery of said rocket and means securing said reflector material to said rocket and responsive to the conditions when the angular velocity of said rocket is approximately equal to the axial velocity of said rocket for releasing said reflector material from said rocket.

6. A device for deploying radar reflector material comprising a spinner rocket, a radar reflector material wound about substantially the entire periphery of said rocket and means securing said reflector material to said rocket and responsive to a critical angular velocity of said rocket for releasing said reflector material from said rocket.

7. The device according to claim 6, wherein said radar reflector material is a monofilament fiberglass thread.

8. The device according to claim 6, wherein said means is an adhesive bonding material.

9. The device according to claim 6, wherein said means is a frangible ring.

10. The device according to claim 6, wherein said critical angular velocity lies within the range of 1,500–4,500 revolutions per second.

* * * * *